(12) United States Patent
Carrillo et al.

(10) Patent No.: US 6,840,568 B2
(45) Date of Patent: Jan. 11, 2005

(54) ENCLOSED ROLL AWNING ASSEMBLY FOR A SLIDE-OUT ROOM OF A RECREATIONAL VEHICLE

(75) Inventors: Alejandro Carrillo, Dearborn, MI (US); Michael Hicks, El Paso, TX (US)

(73) Assignee: Dometic Corporation, Elkhart, IN (US)

( * ) Notice: Subject to any disclaimer, the term of this patent is extended or adjusted under 35 U.S.C. 154(b) by 0 days.

(21) Appl. No.: 10/341,854

(22) Filed: Jan. 14, 2003

(65) Prior Publication Data

US 2004/0135396 A1 Jul. 15, 2004

(51) Int. Cl.$^7$ ............................................. B60R 15/00
(52) U.S. Cl. ..................... 296/163; 296/171; 296/26.13; 135/88.05; 135/88.1; 135/88.11; 135/88.12
(58) Field of Search ................................ 296/163, 171, 296/26.12, 26.13; 52/74, 167, 73; 160/67; 135/88.01, 88.07, 88.05, 88.1, 88.11, 88.12

(56) References Cited

U.S. PATENT DOCUMENTS

| | | | | |
|---|---|---|---|---|
| 5,171,056 A | * | 12/1992 | Faludy et al. | 296/163 |
| 5,280,687 A | * | 1/1994 | Boiteau | 296/163 |
| 6,056,350 A | * | 5/2000 | Brutsaert | 296/163 |
| 6,269,824 B1 | * | 8/2001 | Brutsaert | 296/163 |
| 6,619,726 B2 | * | 9/2003 | Jones | 296/163 |

* cited by examiner

*Primary Examiner*—Lori L. Colletta
(74) *Attorney, Agent, or Firm*—Pearne & Gordon LLP

(57) ABSTRACT

A slide-out room and awning assembly for a recreational vehicle. The assembly includes a roll enclosure for attachment to an exterior side wall of the vehicle, a roll rotationally journalled within the roll enclosure, a slide-out room for extension from the exterior side wall, an elongated trough attached to the slide-out room, and an awning fabric attached at a proximate edge to the roll and attached at a distal edge to the elongated trough. When the slide-out room is in a retracted position, the awning fabric is wrapped around the roll. When the slide-out room is in an extended position, the awning fabric is extended from the roll over a top wall of the slide-out room at a downward slope from the roll to the trough such that debris and liquid flow into the trough.

10 Claims, 2 Drawing Sheets

ENCLOSED ROLL AWNING ASSEMBLY FOR A SLIDE-OUT ROOM OF A RECREATIONAL VEHICLE

BACKGROUND OF THE INVENTION

The present invention relates to roll-type awnings for covering slide-out rooms of recreational vehicles.

It is known to provide a roll-type awning for extension over a slide-out room of a recreational vehicle to prevent rain and debris from accumulating on the roof of the slide-out room. Such awnings generally consist of an awning fabric which is unwound from an awning roll over the roof of the slide-out room.

The roll may be attached to a stationary outside wall of the recreational vehicle above the slide-out room and a free end of the fabric attached to the outside edge of the slide-out room's roof. An example of such an awning is described in U.S. Pat. No. 6,269,824 to Brutsaert.

Alternatively, the roll may be attached the slide-out room and the free end of the fabric attached to the stationary outside wall of the recreational vehicle. An example of a such an awning is disclosed in U.S. Pat. No. 5,752,536 to Becker.

With either awning arrangement, when the slide-out room is extended, the awning fabric automatically extends over the roof of the slide-out room. The awning fabric is sloped downward away from the outside wall of the recreational vehicle to direct water and debris away from the recreational vehicle and the slide-out room.

Further, both of these designs include awning rolls which are mounted externally on the recreational vehicle giving the vehicle a cluttered appearance and creating aerodynamic drag, resulting in wind noise when the vehicle is in motion. Additionally, rain and debris run off at the outside wall of the slide-out room, potentially entering a window of the slide-out room.

SUMMARY OF THE INVENTION

The present invention provides a slide-out room and awning assembly for a recreational vehicle. The assembly comprises a roll enclosure for attachment to an exterior side wall of the vehicle, a roll rotationally journalled within the roll enclosure, a slide-out room for extension from the exterior side wall, an elongated trough attached to the slide-out room, and an awning fabric attached at a proximate edge to the roll and attached at a distal edge to the elongated trough. In a retracted position of the slide-out room the awning fabric is wrapped around the roll. In an extended position of the slide-out room the awning fabric is extended from the roll over a top wall of the slide-out room at a downward slope from the roll to the trough such that debris and liquid flow into the trough.

DETAILED DESCRIPTION OF THE INVENTION

Figure 1:
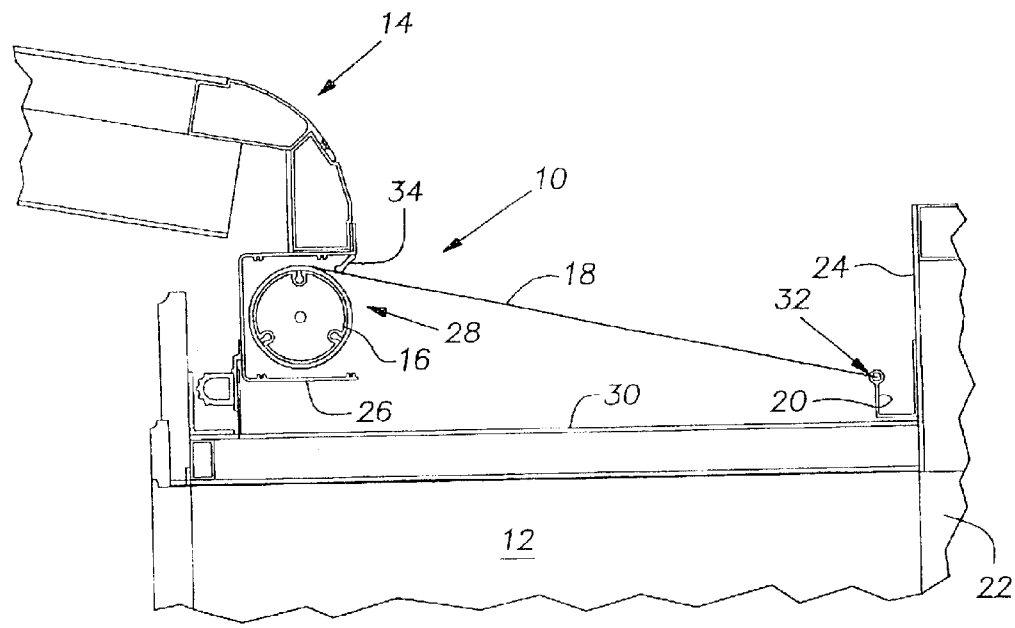
FIG. 1 is a schematic cross section of roll awning for a side-out room of a recreational vehicle showing the slide-out room in an extended position.
Figure 2:
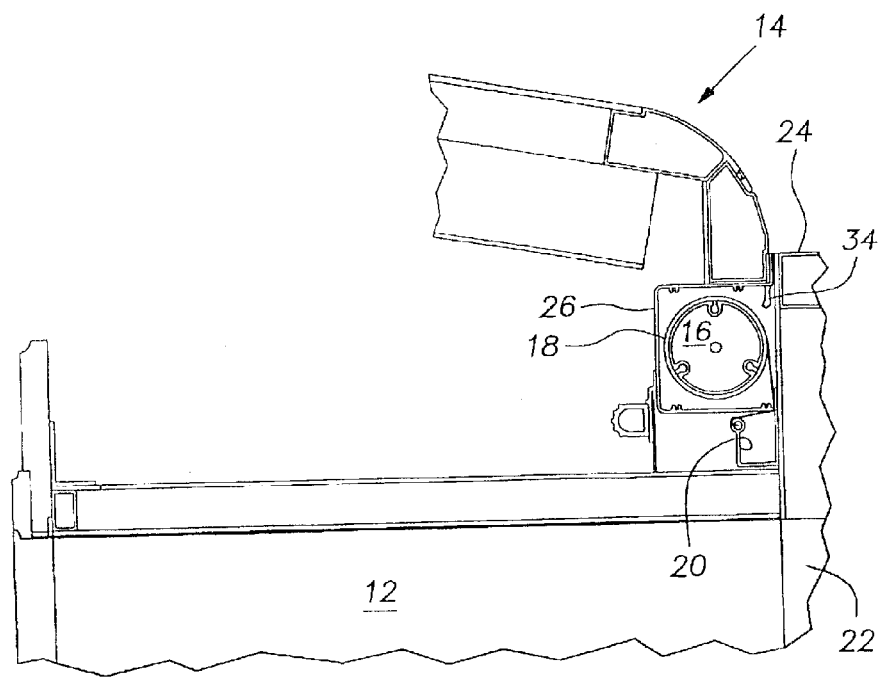
FIG. 2 is a schematic cross section of the roll awning of FIG. 1 showing the slide-out room in a retracted position.
Figure 3:
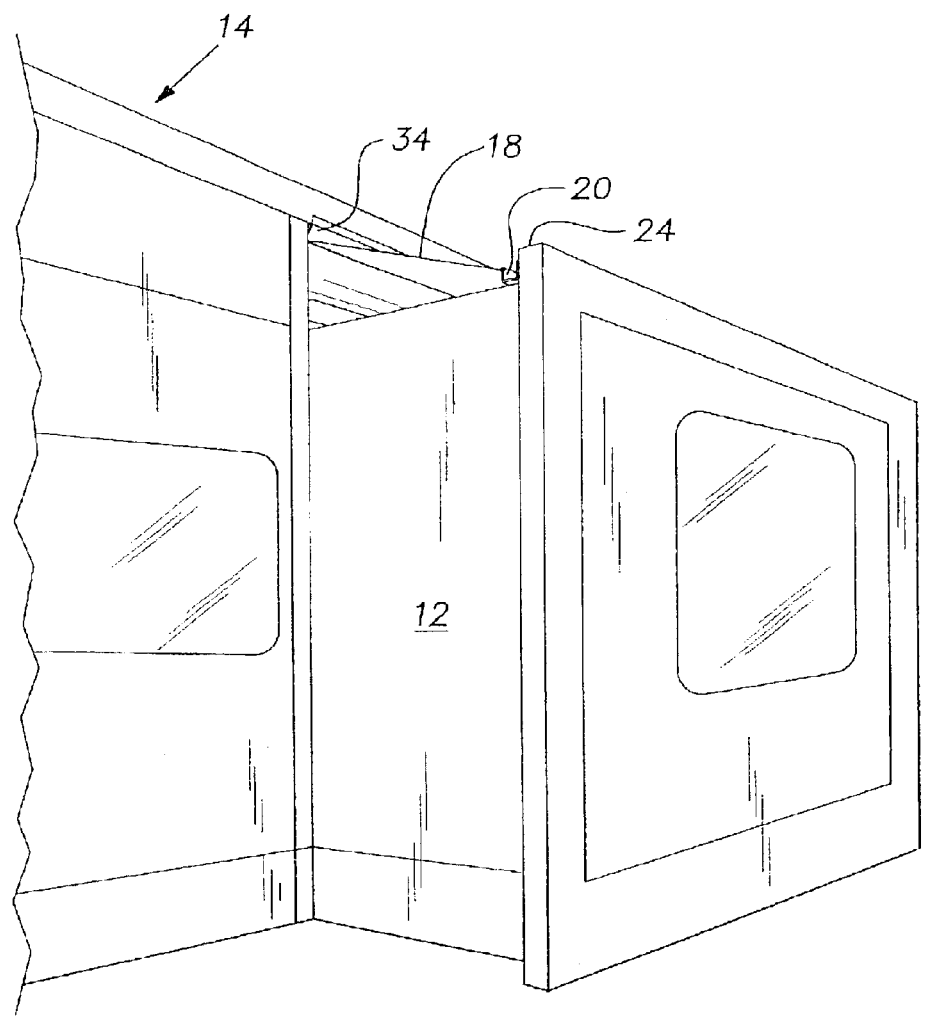
FIG. 3 is a perspective view of the roll awning of FIG. 1 showing the slide-out room in an extended position.

With reference to FIGS. 1–3, the present invention is a roll-up type awning assembly 10 for covering a slide-out room 12 of a recreational vehicle 14. The awning assembly 10 includes an awning take-up roll 16, an extendible awning fabric 18 wound on the roll 16, and a gutter or trough 20 for carrying water and debris away from an outside wall of the slide-out room 12. Further the slide-out room 12 includes a flange 24 which extends upward from the outside wall 22 of the slide-out room 12 to conceal the awning roll 16 when the slide-out room is in a retracted position, as shown in FIG. 2.

A roll enclosure 26 is attached to the outside wall 22 of the recreational vehicle 14 in a fixed position. The awning take-up roll 16 is journalled to the roll enclosure 26. In the closed position of the slide-out room 12 shown in FIG. 2, the awning fabric 18 is wound around the take-up roll 16 and is extendible therefrom. A retraction mechanism (not shown), such as a torsion spring or a motor, is provided between the roll housing 26 and the roll 16 for taking up slack of the awning fabric 18 when the awning is extended, as shown in FIGS. 1 and 3, and for automatically retracting the awning fabric 18 as the slide-out room 12 is retracted into the recreational vehicle 14.

An open side 28 of the roll enclosure 26 faces outward. The trough 20 is attached adjacent to the outside edge of the roof 30 of the slide-out room 12. A free end 32 of the awning fabric 18 extends from the open side 28 of the roll enclosure 26 and is attached at the trough 20. Thus, as the slide-out room 12 is extended out of the recreational vehicle 14, the awning fabric 18 is wound off of the take-up roll 16. The free end 32 of the awning fabric 18 is attached at a point lower than the point at which it extends from the take-up roll 16, such that the awning fabric 18 slopes downward toward the trough 20.

A wiper 34 extends from the upper edge of the roll enclosure 26 to the extended awning fabric 18. A proximate edge of the wiper 34 is pivotally attached to the roll enclosure 26 and a distal edge of the wiper 34 rests against the fabric 18. As the fabric 18 is retracted onto the take-up roll, water and debris are cleared from the top of the fabric 18 by the wiper 34.

Further, the awning fabric 18 is wound around the take-up roll 16 such that the fabric 18 extends from the top of the roll 16. Thus, as the fabric 18 is wound onto the roll 16, any remaining water and debris that were not removed by the wiper 34 will fall from the fabric 18 within the enclosure 26 without being wrapped up inside of the fabric 18.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A slide-out and awning assembly for a recreational vehicle comprising:
   a recessed area of an exterior side wall of the vehicle;
   a roll rotationally journalled within the recessed area such that it is completely contained within the recessed area;
   a slide-out for extension from the exterior side wall; and
   an elongated trough attached to the slide-out for carrying away liquid from an awning fabric attached at a proximate edge to the roll and attached at a distal edge to the elongated trough;

wherein in a retracted position of the slide-out the awning fabric is wrapped around the roll.

2. The assembly of claim 1 further comprising a roll enclosure surrounding the roll and attached within the recessed area.

3. A slide-out and awning assembly for a recreational vehicle comprising:

a recessed area of an exterior side wall of the vehicle;

a roll rotationally journalled within the recessed area such that it is completely contained within the recessed area;

a slide-out for extension from the exterior side wall;

an elongated trough attached to the slide-out; and an awning fabric attached at a proximate edge to the roll and attached at a distal edge to the elongated trough, wherein in a retracted position of the slide-out the awning fabric is wrapped around the roll;

a roll enclosure surrounding the roll and attached within the recessed area; and a wiper pivotally attached to and extending from the roll enclosure to a top side of the awning fabric for clearing debris and liquid from the awning fabric as the awning fabric is wound onto the roll.

4. A slide-out and awning assembly for a recreational vehicle comprising:

a recessed area of an exterior side wall of the vehicle;

a roll rotationally journalled within the recessed area such that it is completely contained within the recessed area;

a slide-out for extension from the exterior side wall;

an elongated trough attached to the slide-out; and an awning fabric attached at a proximate edge to the roll and attached at a distal edge to the elongated trough, wherein in a retracted position of the slide-out the awning fabric is wrapped around the roll;

a flange extending vertically from the slide-out and concealing the roll when the slide-out is in the retracted position.

5. The assembly of claim 1, wherein in an extended position of the slide-out the awning fabric is extended from the roll over the slide-out at a downward slope from the roll to the trough such that debris and liquid flow into the trough.

6. A recreation vehicle comprising:

an exterior side wall;

a recessed area of the exterior side wall;

a roll rotationally journalled within the recessed area;

a slide-out room for extension from the exterior side wall;

a flange extending from the slide-out room; and an awning fabric attached at a proximate edge to the roll and attached at a distal edge to the flange;

wherein in a retracted position of the slide-out the awning fabric is wrapped around the roll and the flange covers the recessed area enclosing the roll.

7. The recreational vehicle of claim 6 further comprising a roll enclosure surrounding the roll and attached within the recessed area.

8. A recreational vehicle comprising:

an exterior side wall;

a recessed area of the exterior side wall;

a roll rotationally journalled within the recessed area;

a slide-out room for extension from the exterior side wall;

an awning fabric attached at a proximate edge to the roll, wherein in a retracted position of the slide-out the awning fabric wrapped around the roll;

roll enclosure surrounding the roll and attached within the recessed area; and a wiper pivotally attached to and extending from the roll enclosure to a top side of the awning fabric for clearing debris and liquid from the awning fabric as the awning fabric is wound onto the roll.

9. A recreational vehicle comprising:

an exterior side wall;

a recessed area of the exterior side wall;

a roll rotationally journalled within the recessed area;

a slide-out room for extension from the exterior side wall;

an awning fabric attached at a proximate edge to the roll and attached at a distal edge to a flange, wherein in a retracted position of the slide-out the awning fabric is wrapped around the roll; and the flange extending vertically from the slide-out room and concealing the roll when the slide-out is in the retracted position.

10. The recreational vehicle of claim 6 further comprising an elongated trough attached to the slide-out room, and wherein in an extended position of the slide-out room the awning fabric is extended from the roll over the slide-out room at a downward slope from the roll to the trough such that debris and liquid flow into the trough.

* * * * *